United States Patent [19]

Oka

[11] Patent Number: 4,966,215
[45] Date of Patent: Oct. 30, 1990

[54] TIRE PAIR FOR A TWO-WHEELED VEHICLE

[75] Inventor: Takeshi Oka, Kodaira, Japan

[73] Assignee: Bridgestone Corporation, Tokyo, Japan

[21] Appl. No.: 323,904

[22] Filed: Mar. 15, 1989

[30] Foreign Application Priority Data

Mar. 18, 1988 [JP] Japan .................................. 63-66164

[51] Int. Cl.⁵ .......................... B60C 9/18; B60C 9/28
[52] U.S. Cl. .................................... 152/538; 152/526
[58] Field of Search ............ 152/538, 559, 560, 209 R, 152/536, 526; 180/219, 223

[56] References Cited

U.S. PATENT DOCUMENTS

| 3,980,118 | 9/1976 | Kinas | 152/209 R |
| 4,510,983 | 4/1985 | Ohkuni et al. | 152/209 R X |
| 4,757,850 | 7/1988 | Nakasaki et al. | 152/209 R |

FOREIGN PATENT DOCUMENTS

| 60-213503 | 10/1985 | Japan | 152/560 |
| 60-16105 | 1/1986 | Japan | 152/560 |

Primary Examiner—Robert A. Dawson
Assistant Examiner—Gregory J. Wilber
Attorney, Agent, or Firm—Sughrue, Mion, Zinn, Macpeak & Seas

[57] ABSTRACT

A tire assembly for a two-wheeled vehicle includes tires to be equipped on front and rear wheels, respectively. Each of the tires includes a carcass layer of organic fiber cords arranged at angles of substantially 80° for the front wheel tire or 90° for the rear wheel tire, and a belt layer of organic fiber cords arranged at angles of 5° to 35°. The belt layer of each of the tires consists of inner, intermediate and outer layers. With the front wheel tire, a width of the intermediate layer is narrower than that of the inner layer to form a step of substantially 10 mm on one side and a width of the outer layer is narrower than that of the intermediate layer to form a step of substantially 30 mm on one side. On the other hand, with the rear wheel tire, a width of the intermediate layer is wider than that of the inner layer and a width of the outer layer is wider than that of the intermediate layer to form steps of substantially 7 mm successively at one sides of the respective layers.

7 Claims, 2 Drawing Sheets

TIRE PAIR FOR A TWO-WHEELED VEHICLE

BACKGROUND OF THE INVENTION

This invention relates to a tire assembly for a two-wheeled vehicle, and more particularly to a tire assembly to be used as a front and a rear wheel for a two-wheeled vehicle and having a belt construction improved to obtain best stability and traveling performance when traveling at high speeds.

For example, radial tires have been used for front and rear wheels of two-wheeled vehicles. In order to improve the stability of, for example, radial tires when traveling, a belt layer to be interposed between a tread and a carcass consists of a plurality of nylon belt layers made of nylon cords arranged with different widths to form steps by narrowing their widths progressively from the carcass to the tread. Such steps of belt layers narrowing their widths from the carcass to the tread are referred to hereinafter as a "positive step". However, this arrangement is disadvantageous because of insufficient rigidity of the belt.

In the case where sporty traveling performance is important, it is needed to improve braking capacity, stability in acceleration and gripping performance in turning. Therefore, in order to increase the belt rigidity, a Kevlar belt layer made of Kevlar cords must unavoidably be used in positive steps at the sacrifice of cost and durability.

In order to improve the rigidity of the nylon belt for a tire, moreover, it can be conceivable that the belt is made in three layers. With a tire for a front wheel, however, when shoulder portions are thick having more than three layers, the rigidity of the shoulder portions becomes excessively high. As a result, it is difficult to obtain self-aligning of tires in negative directions to supplement camber thrust for tires for a two-wheeled vehicle in banking. Therefore, a rider of the two-wheeled vehicle is required to modify the vehicle position by pulling a handle bar in the banking direction. Accordingly, smooth handle operation is detrimentally affected. Moreover, when the rigidity of the shoulder portions is higher, a particular phenomenon of radial tires referred to as "chattering" is likely to occur. This is the jumping up of a vehicle body.

With tires for rear wheels, a belt construction having the usual positive steps is particularly poor in rigidity of shoulder portions. Therefore, stability in full-banking and sufficient rigidity in acceleration under a banked condition when returning from cornering could not be obtained so that reaction capacity is lowered.

SUMMARY OF THE INVENTION

It is an object of the invention to provide an improved tire assembly for a two-wheeled vehicle, which eliminates all the disadvantages of the prior art and is superior in stability and traveling performance when equipped on the two-wheeled vehicle and traveling at high speeds.

The inventors of the present application have investigated relations between performance required for tires and tire constructions, particularly belt constructions and belt materials in various manners.

As a result, it has been found that in order to improve the rigidity of nylon belts as much as possible, it is preferable to use belt layers more than three. With tires for front wheels, it has been found that a belt layer is preferably made of three layers, inner, intermediate and outer layers from a carcass to outside and the inner and intermediate layers are preferably in positive steps of about 10 mm so that the outer layer is narrowest and arranged at a center portion of the belt layer, and contacting portions of shoulders traveling in full banked condition are of two layers.

Moreover, with tires for rear wheels, it has been found that in order to improve bending rigidity of belt layers to the maximum, three belt layers are preferably made as wide as possible and wider as they arranged outwardly or near to a tread to have steps of about 10 mm on one side. Such an arrangement of belt layers wider as they arranged near to a tread is referred to herein "negative step".

The inventors have continued the earnest investigation to complete the invention.

In a tire pair for a two-wheeled vehicle including two tires to be equipped on front and rear wheels of the vehicle, respectively, each of the tires including a carcass layer made of at least one layer of organic fiber cords arranged at angles of 60° to 90° relative to circumferential directions of the tire, and a belt layer made of at least two layers having different widths and arranged radially outwardly of said carcass layer at its crown zone, said at least two layers having organic fiber cords arranged at angles of 5° to 35° relative to the circumferential directions of the tire, and said cords in adjacent layers intersecting with each other. According to the invention, the tire to be equipped on the front wheel of the vehicle, one of said at least two layers of the belt layer arranged on a radially outer side has a width narrower than the other layer arranged on a radially inner side. The tire to be equipped on the rear wheel of the vehicle, has one of said at least two layers of the belt layer arranged on a radially outer side having a width wider than the other layer arranged on a radially inner side.

The carcass layer and the belt layer of each tire of the pair are preferably made of nylon cords, and angles of the cords of the carcass layer of the tire to be equipped on the front wheel relative to the circumferential directions of the tire are preferably smaller than cords of the carcass layer of the tire to be equipped on the rear wheel.

Moreover, it is preferable that angles of the cords of the carcass layer of the tire to be equipped on the front wheel relative to the circumferential directions of the tire are substantially 80°, while angles of the cords of the carcass layer of the tire to be equipped on the rear wheel relative to the circumferential directions of the tire are substantially 90°.

The belt layer is preferably made of three layers of nylon cords.

It is preferable that the belt layer of each of tires consists of inner, intermediate and outer layers from a carcass side radially outwardly and widths of these layers successively varying to form steps at belt edges. For the tire to be equipped on the front wheel, a width of the intermediate layer is narrower than that of the inner layer to form a step of substantially 10 mm on one side and a width of the outer layer is narrower than that of the intermediate layer to form a step of substantially 30 mm on one side. For the tire to be equipped on the rear wheel, a width of the intermediate layer is wider than that of the inner layer and a width of the outer layer is wider than that of the intermediate layer to form steps of substantially 7 mm successively at one sides of the respective layers.

It is preferable that angles of the cords of the belt layers of the front wheel tire are larger than those of the rear wheel tire.

In another embodiment of the invention, the cords of the belt of the front wheel tire are made of aromatic polyamide and at angle of 10° to 30° relative to the circumferential directions of the tire and the cords of the belt of the rear wheel tire are made of nylon and at angles of 5° to 25° relative to the circumferential directions of the tire.

According to the invention, with the front wheel tire, the belt layer is arranged in more than three layers only at the center so that sufficient belt rigidity is obtained. Therefore, even with a nylon cord belt layer, rigidity feeling and stability in braking can be obtained to the same extent as with two belt layers made of Kevlar cords.

Moreover, since shoulder portions of the tire are of two belt layers, handling performance in traveling is improved. As only the center portion of the belt layers are of three layers, shearing stresses in sectional directions at the center are lowered so that shimmy-resistance in traveling is improved.

Furthermore, with the rear wheel tire, since belt layers made of nylon cords are widely arranged, bending rigidity of the belt layers is increased and higher stability in turning and grip feeling in traveling are obtained.

In order that the invention may be more clearly understood, preferred embodiment will be described, by way of example, with reference to the accompanying drawings.

DETAILED EXPLANATION OF PREFERRED EMBODIMENTS

FIGS. 1–4 illustrate one embodiment of the tire assembly for a two-wheeled vehicle according to the invention. First, the construction of the assembly will be explained.

Figure 1:
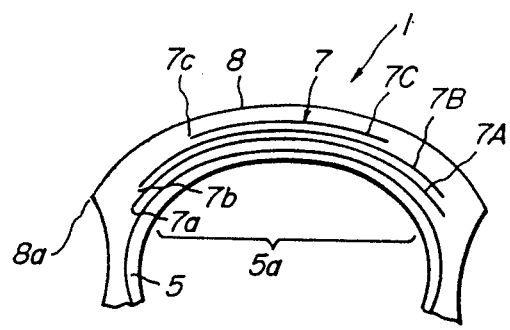
FIG. 1 is a partial sectional view of a tire of the tire pair according to the invention to be equipped on a front wheel of a two-wheeled vehicle.
Figure 2:
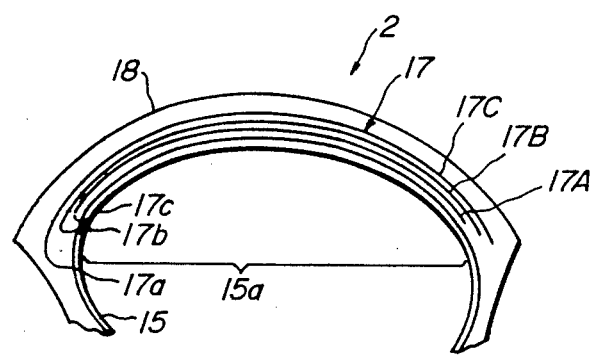
FIG. 2 is a partial sectional view of a tire of the tire pair according to the invention to be equipped on a rear wheel of the two-wheeled vehicle.

The tires shown in FIGS. 1 and 2 are radial tires for front and rear wheels of a two-wheeled vehicle having an exhaust displacement of the order of 400 cc. Sizes of the front and rear wheel radial tires 1 and 2 are 110/70R 17 and 140/60R 18, respectively. The front and rear wheel radial tires 1 and 2 constitute the tire assembly for a two-wheeled vehicle according to the invention.

Figure 3:
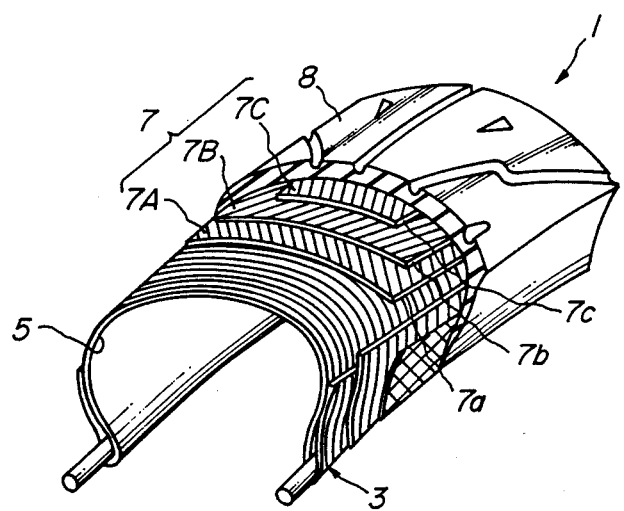
FIG. 3 is a partial perspective view of the tire shown in FIG. 1.

As shown in FIGS. 1 and 3, the radial tire 1 for the front wheel comprises a pair of annular beads 3, a two-layer carcass 5 toroidally extending between the beads 3, a belt layer laminated in three layers arranged radially outwardly of a crown zone 5a of the carcass 5 in circumferential directions of the tire, and a tread 8 covering an outer surface of the belt layer 7.

The carcass 5 is made of two rubber-coated nylon cord layers whose cord angles are about 80° relative to circumferential directions of the tire. The belt layer 7 is made of three cord layers or an inner layer 7A, an intermediate layer 7B and an outer layer 7C whose rubber coated nylon cords are arranged at approximately 20° relative to the circumferential directions of the tire, respectively. In this case, the nylon cords of the inner and intermediate layers 7A and 7B are 1890d/2 which are very thick. The nylon cords of the outer layer 7C are 890d/2. The nylon cords of the adjacent cord layers are arranged to intersect with each other in a manner extending from upper left hands to lower right hands in the outer layer, from upper right hands to lower left hands in the intermediate layer and upper left hands to lower right hands in the inner layer as viewed from outside of the tire. Moreover, these three cord layers are different in width.

As shown in FIGS. 1 and 3, the belt layer for the front tire arranged radially outwardly has a narrower belt width than the belt layer arranged radially inwardly. For example, the intermediate layer 7B has a narrower width than the inner belt layer 7A arranged radially inwardly of the intermediate layer 7B. In other words, width edges of the respective belt layers form the positive steps. The width edges 7a and 7b of the inner and intermediate belt layers 7A and 7B have steps of about 7 mm on one side of the belt 7. On the other hand, width edges 7b and 7c of the intermediate and outer belt layers 7B and 7C have steps of about 25 mm in axial directions. Moreover, the belt edges 7c of the outer layer 7C and shoulders 8a of the tread 8 are spaced from each other by 5 mm. As a result, the belt layer 7 has a sufficient belt rigidity so that rigidity feeling and stability in braking can be obtained in traveling. Moreover, the shoulder portions are of two layers so that handling in during running and shimmy-resistance are improved.

Referring to FIG. 2, the radial tire 2 for a rear wheel comprises a pair of annular beads 13, a two-layer carcass 15 toroidally extending between the beads 13, a belt layer 17 laminated in three layers arranged radially outwardly of a crown zone 15a of the carcass 15 in circumferential directions of the tire, and a tread 18 covering an outer surface of the belt layer 17.

The carcass 15 is made of two rubber-coated nylon cord layers whose cord angles are about 85° relative to circumferential directions of the tire. The belt layer 17 is made of three cord layers. They are an inner layer 17A, an intermediate layer 17B and an outer layer 17C whose rubber coated nylon cords are arranged at approximately 15° relative to the circumferential directions of the tire, respectively.

The nylon cords of the adjacent cord layers are arranged to intersect with each other in a manner extending from the upper left hand to lower right hands in the outer layer, from the upper right hand to lower left hand in the intermediate layer and upper left hand to lower right hand in the inner layer as viewed from outside of the tire. Moreover, these three cord layers are different in width.

Figure 4:
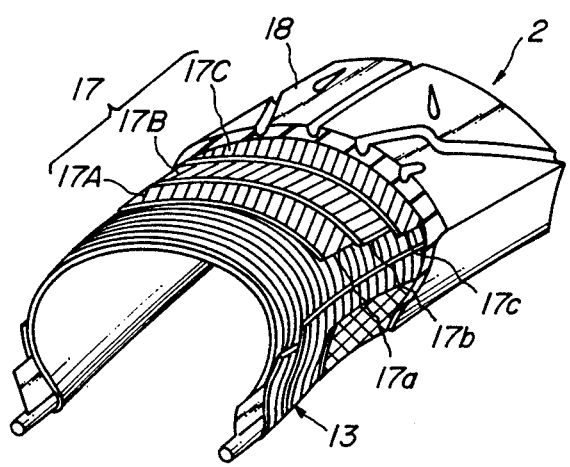
FIG. 4 is a partial perspective view of the tire shown in FIG. 2.

As shown in FIGS. 2 and 4, the belt layer arranged radially outwardly has a wider belt width than the belt layer arranged radially inwardly. For example, the intermediate layer 17B has a wider width than the inner belt layer 17A arranged radially inwardly of the intermediate layer 17B. In other words, width edges of the respective belt layers form the negative steps. The width edges 17a and 17b of the inner and intermediate belt layers 17A and 17B have steps of about 7 mm on one side of the belt 7 in axial directions of the tire. On the other hand, width edges 17b and 17c of the intermediate and outer belt layers 17B and 17C have steps of about 7 mm in the axial directions of the tire.

Moreover, the belt edges 17c of the outer layer 17C and shoulders 18a of the tread 18 are spaced from each other by 5 mm. As a result, the belt layer 17 has a sufficient belt rigidity so that higher turning stability and grip feeling can be obtained in during running.

The invention is not limited to the embodiment above described. For example, the cords of the carcass layers may be arranged within angles 0° to 30° relative to circumferential directions of the tire. The number of the belt layer may be more than two. Cords of the respective layers may be arranged within angles 5° to 30° relative to the circumferential directions of the tire.

Moreover, with the belt layer 7 of the front tire, width edges 7a and 7b of the inner and intermediate layers 7A and 7B have steps of about 7 mm in axial directions of the tire, and width edges 7b and 7c of the intermediate and outer layers 7B and 7C have steps of about 30 mm. On the other hand, with the belt layer 17 of the rear tire, width edges 17a and 17b of the inner and intermediate layers 17A and 17B have steps of 7 mm, and width edges 17b and 17c of the intermediate and outer layers 17B and 17C have also steps of 7 mm.

Furthermore, with belt layers having cords made of aromatic polyamide, for example, Kevlar, belt layers of tires for front wheels are preferably constructed in positive steps, because of excessive rigidity resulting from negative steps. In tires for rear wheels, moreover, the negative steps are preferable because separation at belt ends tends to occur with the positive steps.

In order to improve durability, a belt layer of a tire for a rear wheel may be made of two belt layers using Kevlar and further all the width of the belt layer of Kevlar may be covered by a belt layer using wide nylon cords. With such a construction of the Kevlar belt layer, any separation at belt ends is prevented even with the positive step construction. In consideration of grip performance on a road, however, only part of Kevlar belt layer may be covered by a narrow nylon cords to make stable the nylon layers. In this case, the Kevlar belt layer is preferably made in the negative steps in view of the durability.

The inventor prepared and tested five kinds of tire assemblies for two-wheeled vehicles (embodiment of the invention and comparative examples) to ascertain the effect of the invention) which will be explained herein.

The tires of the embodiment in the test were substantially the same as the embodiments shown in FIGS. 1–4. On the other hand, the tires of the comparative examples 1–4 were front and rear wheel tires having belt layers whose kinds of cords, the number of belt layers and step construction at belt ends of belt layers are shown in attached Table I. Other constructions of the tires of the comparative examples were substantially the same as those of the embodiment.

The tire assemblies to be tested were equipped on front and rear wheels of a two-wheeled vehicle for testing. A plurality of test drivers rode on the test vehicle to drive it in a predetermined course at a predetermined speed to test the tires on items shown in the preamble of the Table II. Results obtained by feeling are estimated by five points and shown by average values. The estimated results are in the Table II. Numeral 5 indicates good. The smaller the numeral, the result is poor.

As shown in the test results in the Table II, the tires of the embodiment exhibited good results in comparison with the tires of comparative examples. It is clear that with the tires of the embodiment, front and rear wheels are greatly improved in performances in traveling. The tire assembly according to the invention is improved in stability and traveling performances.

As can be seen from the above description, the invention can greatly improve the rigidity of front wheel tires in traveling at high speeds, the stability in braking, the handling performance and the shimmy-resistance, and the turning stability and grip feeling of the rear wheel tires. Therefore, the stability and traveling performances of tire assemblies for two-wheeled vehicles are considerably improved.

It is further understood by those skilled in the art that the foregoing description is that of preferred embodiments of the disclosed tires and that various changes and modifications may be made in the invention without departing from the spirit and scope thereof.

TABLE I

| Test tire | | Comparative example 1 | Comparative example 2 | Comparative example 3 | Comparative example 4 | Embodiment of the invention |
|---|---|---|---|---|---|---|
| Tire for front wheel | Kind and number of cords | Nylon 2 | Nylon 3 | Nylon 3 | Kevlar 2 | Nylon 3 |
| | Step construction | Positive step | Negative step | Positive step | Positive step | Positive step |
| Tire for rear wheel | Kind and number of cords | Nylon 2 | Nylon 3 | Nylon 3 | Kevlar 2 | Nylon 3 |
| | Step construction | Positive step | Positive step | Positive step | Positive step | Negative step |

TABLE II

| Test tire | | Comparative example 1 | Comparative example 2 | Comparative example 3 | Comparative example 4 | Embodiment of the invention |
|---|---|---|---|---|---|---|
| Tire for front wheel | Difficulty in fall down | 5 | 3 | 5 | 4 | 5 |
| | Light feeling of handle bar | 3 | 4 | 4 | 5 | 4 |
| | Linearity | 5 | 3 | 4 | 4 | 4 |
| | Front jumping | 5 | 4 | 5 | 3 | 5 |
| | Balanced braking | 3 | 4.5 | 4 | 5 | 4 |
| | Shimmy-resistance | 4 | 5 | 5 | 3 | 5 |
| Tire for rear wheel | Non-wobble | 4 | 5 | 5 | 3 | 5 |
| | Rigidity feeling in turning | 3 | 4 | 4 | 5 | 4.5 |
| | Grip feeling | 3 | 3.5 | 3.5 | 5 | 4.0 |
| | Ridding comfortability | 5 | 4 | 4 | 3 | 4 |

TABLE II-continued

| | | | | | |
|---|---|---|---|---|---|
| Non-wobble in acceleration | 3 | 4.0 | 4.0 | 5 | 5.0 |

What is claimed is:

1. A pair of tires for a two-wheeled vehicle respectively mounted on front wheel and a rear wheel of the vehicle comprising a front tire and a rear tire, respectively; each of the tires including a carcass layer made of at least one layer of organic fiber cords arranged at angles of 60° to 90° relative to circumferential directions of the tire, and a belt layer made of at least two layers having different widths and arranged radially outwardly of said i carcass layer at its crown zone, said at least two layers having organic fiber cords arranged at angles of 5° to 35° relative to the circumferential directions of the tire, and said cords in adjacent layers intersecting with each other, said front tire having one of said at least two layers of the belt layer arranged on a radially outer side with a width narrower than the other layer arranged on a radially inner side and cord angles of belt layers of said front tire being greater than cord angles of belt layers of said rear tire, and with said rear tire, one of said at least two layers of the belt layer arranged on a radially outer side having a width wider than the other layer arranged on a radially inner side, in said front tire the radially innermost belt layer has a maximum belt width and remaining belt layers become narrower as they are arranged radially outward and in said rear tire the radially innermost belt layer has a minimum belt width and remaining belt layers become wider as arranged radially outward.

2. A tire assembly as set forth in claim 1, wherein said carcass layer and said belt layer of each tire are made of only cords.

3. A tire assembly as set forth in claim 1, wherein angles of the cords of the carcass layer of the tire to be equipped on the front wheel relative to the circumferential directions of the tire are smaller than those of cords of the carcass layer of the tire to be equipped on the rear wheel.

4. A tire assembly as set forth in claim 1, wherein angles of the cords of the carcass layer of the tire to be equipped on the front wheel relative to the circumferential directions of the tire are substantially 80°, while angles of the cords of the carcass layer of the tire to be equipped on the rear wheel relative to the circumferential directions of the tire are substantially 90°.

5. A tire assembly as set forth in claim 1, wherein said belt layer is made of three layers of nylon cords.

6. A tire assembly as set forth in claim 1, wherein said belt layer of each of tires consists of inner, intermediate and outer layers from a carcass side radially outwardly and widths of these layers successively varying to form steps at belt edges, and wherein in the tire to be equipped on the front wheel, a width of the intermediate layer is narrower than that of the inner layer to form a step from end points of the layers in the axial direction of substantially 10 mm on one side and a width of the outer layer is narrower than that of the intermediate layer to form a step from end points of the layers in the axial direction of substantially 30 mm on one side, and with the tire to be equipped on the rear wheel, a width of the intermediate layer is wider than that of the inner layer and a width of the outer layer is wider than that of the intermediate layer to form steps of substantially 7 mm successively at one sides of the respective layers.

7. A tire assembly as set forth in claim 1, wherein said cords of the belt of the tire to be equipped on the front wheel are made of aromatic polyamide and at angles of 10° to 30° relative to the circumferential directions of the tire, and said cords of the belt of the tire to be equipped on the rear wheel are made of nylon cords and at angles of 5° to 25° relative to the circumferential directions of the tire.

* * * * *